Patented Mar. 18, 1947

2,417,740

UNITED STATES PATENT OFFICE 2,417,740

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application July 13, 1945, Serial No. 604,992

6 Claims. (Cl. 252—340)

This invention relates to the resolution of petroleum emulsions.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure.

The demulsifying agent used in my herein described process for resolving petroleum emulsions, consists of an hydroxyacetylated (including polyhydroxyacetylated) and oxidized dimer of 9,11-linolo-diricinolein. Oxidation and hydroxyacetylation have been applied to castor oil in order to produce a product having utility in demulsification of crude petroleum emulsions. U. S. Patent No. 2,340,305, dated February 1, 1944, to De Groote et al., is concerned with a drastically-oxidized hydroxyacetylated ricinoleic acid compound such as castor oil. Similarly, U. S. Patent No. 2,340,306, dated February 1, 1944, to De Groote et al., is concerned with a hydroxyacetylated, drastically-oxidized castor oil. Similarly, U. S. Patent No. 2,340,308, dated February 1, 1944, to De Groote et al., is concerned with a similar type of demulsifier in which a comparatively large proportion of hydroxyacetic acid is employed so as to produce a polyhydroxyacetic acid radical.

I have found that when castor oil is replaced by the dimer of 9,11-linolo-diricinolein, one obtains new chemical compounds or products which are particularly valuable for numerous purposes and are particularly effective as demulsifying agents. Moreover, the two procedures involved, to wit, oxidation and hydroxyacetylation, can be conducted stepwise, one after the other in either direction, but may, in preparing derivatives of 9,11-linolo-diricinolein dimer be conducted simultaneously, and thus, afford a distinct advantage, in comparison with the description of the products derived from castor oil, as disclosed in the two aforementioned patents. For that matter, castor oil, diricinolein, diolein, and the like, may be subjected to hydroxyacetylation to yield a product of value in demulsification of petroleum emulsions. See U. S. Patent No. 2,340,355, dated February 1, 1944, to Wirtel.

In my co-pending application Serial No. 604,991, filed July 13, 1945, it has been pointed out that oxidation alone of 9,11-linolo-diricinolein dimer yields a valuable product for demulsification. Since the herein contemplated product or products may be prepared by first subjecting the specified dimer to oxidation and then following by hydroxyacetylation, it may be most convenient to repeat much of what is said in my co-pending application Serial No. 604,991, filed July 13, 1945, in regard to the preparation of an oxidized dimer of 9,11-linolo-diricinolein.

Oxidation is effected by means of a gaseous oxygen-containing medium, particularly moist or dry air, and is conducted in the manner commonly used to blow or oxidize castor oil or the like, in the production of blown castor oil. The conventional dehydration of castor oil or ricinoleic acid, or some other ester, results in the formation of a diene acid, with the probability that two reactions ordinarily go to approximately the same degree. These reactions may be illustrated in the following manner:

REACTION 1

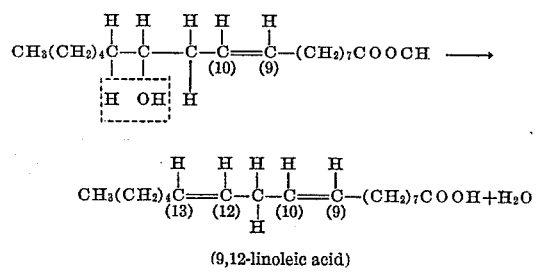

(9,12-linoleic acid)

REACTION 2

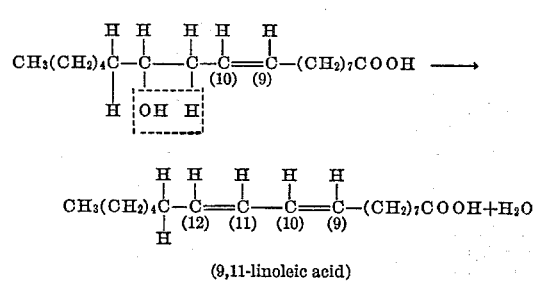

(9,11-linoleic acid)

United States patents which illustrate this procedure, are the following: Patents Nos. 2,140,271, dated Dec. 13, 1938, to Schwarcman; 2,195,225, dated Mar. 26, 1940, to Priester;

2,209,065, dated July 23, 1940, to Pelikan; 2,212,385, dated Aug. 20, 1940, to Brod; 2,226,830, dated Dec. 31, 1940, to Priester; 2,226,831, dated Dec. 31, 1940, to Priester; 2,246,768, dated June 24, 1941, to Ubben; 2,261,663, dated Nov. 4, 1941, to Rheineck; 2,336,186, dated Dec. 7, 1943, to Nessler; and 2,351,444, dated June 13, 1944, to Miller.

The mixed isomers may be treated so as to convert the unconjugated isomer into the conjugated isomer. This isomerization reaction may be indicated thus:

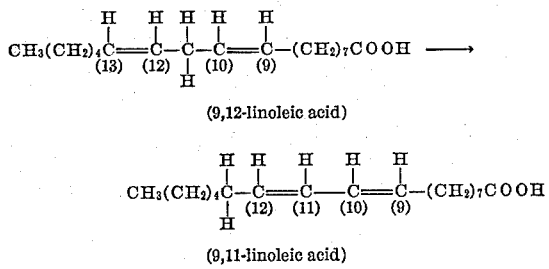

United States patents which exemplify a procedure of the kind indicated are: Patents Nos. 2,185,414, dated Jan. 2, 1940, to McKinney; 2,242,230, dated May 20, 1941, to Burr; and 2,350,583, dated June 6, 1944, to Bradley.

9,11-linoleic acid of approximately 80% to 85% purity is obtainable in the open market and also available in the form of the ethyl or methyl ester. Ignoring matters of cost, I prefer to prepare the monomeric mixed glyceride from this particular product. Methyl or ethyl ricinoleate, which can be prepared in the usual manner or purchased in the open market, is reacted in the customary manner with glycerol monochlorohydrin, using two moles of the ester for two moles of the chlorohydrin. The reaction may be indicated thus:

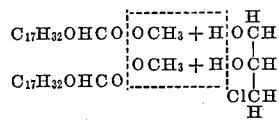

The 9,11-linoleic acid is converted into the anhydrous sodium salt and reacted mole for mole with the above intermediate in presence of anhydrous alcohol or some other suitable solvent. This reaction may be indicated thus:

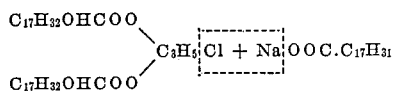

Other alternate procedures may be used, and particularly some in which the percentage of mixed glyceride is not as high in the product obtained by the described procedure, but still sufficiently high for the manufacture of valuable products for the employment of processes herein described.

In regard to the above esterification procedure or alternate procedure, see the comprehensive article entitled "Polyhydric alcohol esters of fatty acids," in Chemical Reviews, volume 3, No. 3, at page 257.

The polymerization of the diene acid is conducted in the same identical manner employed for the polymerization of the methyl ester. The polymerization of the methyl ester is described in various patents, as, for example: Patents Nos. 2,325,040, dated July 27, 1943, to Cook et al.; 2,347,562, dated Apr. 25, 1944, to Johnston; and 2,357,839, dated Sept. 12, 1944, to Evans et al.

The dimerization of the methyl ester may be indicated in the following manner:

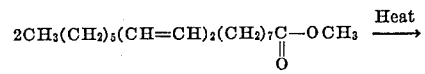

2 moles methyl ester 9,11-octadecadienic acid (originally present and/or formed by isomerization of 9/12 isomer)

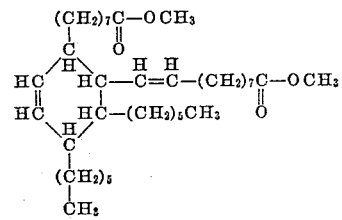

(See U. S. Patent No. 2,347,562, dated April 25, 1944, to Johnston, above mentioned.)

In polymerization of polyene acid esters, it has been found that temperatures between about 250° C. and about 350° C. are suitable for polymerization. The time required for this polymerization varies not only with the temperature, but with the acid and the particular ester which is used. Generally a period of from about one-half an hour to about 50 hours is suitable, and in most instances, the polymerization may be effected in not over 12 hours. If a conjugated unsaturated ester, such as the methyl ester of oleostearic acid be employed, a sufficient degree of polymerization may be obtained within one-half to one hour at about 300° C., whereas, the methyl linolenates and linoleates generally require from about 5 to 12 hours or more. To speed up the polymerization process, suitable catalysts may be added, examples of which are: fuller's earth (preferably acid-treated), bentonite (preferably acid-treated), stannic chloride, etc. If catalysts be employed, it is sometimes possible to use lower temperatures and/or shorter periods of time than those indicated above. Substantially the same conditions may be used for dimerization, provided, however, that they must be below the point where dehydration of the ricinoleic acid radical takes place. In other words, in the present instance the upper temperature limit is approximately 250° C., and, as a result of a somewhat lower temperature, it is sometimes desirable to use a longer time period for isomerization, for instance, a time period as long as twenty-four to forty-eight hours.

Other means for inducing or hastening or catalyzing polymerization of the above described reactants are well known. See, for example, U. S. Patent No. 2,207,686, dated July 9, 1940, to Schwarcman.

In any event, any suitable procedure is used to prepare the mixed glyceride, which has the following formula:

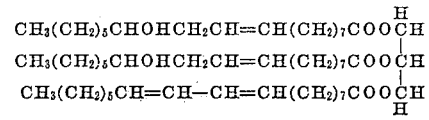

Such mixed glyceride is then dimerized in the manner previously described to produce the dimer of the following formula:

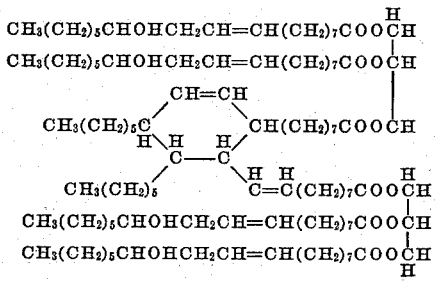

An examination of the preceding formula immediately suggests additional procedures for producing the dimer of the mixed glyceride. For instance, a raw material which can be readily prepared or purchased in the open market is diricinolein. The formula for such product, ignoring isomeric forms, is, of course:

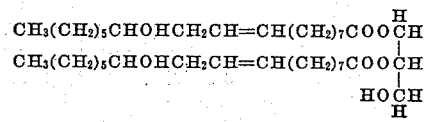

It become obvious that if two moles of diricinolein could be reacted with one mole of the dimeric acid which has been previously depicted in the form of a methyl ester, one would then obtain the dimerized mixed glyceride previously described. The objection to such procedure, however, is that reaction cannot be limited to the hydroxyl attached to the glycerol residue, and, in fact, may involve the ricinoleyl hydroxyl radical. Thus, such procedure, although giving fair yields, also gives admixture with other products which preferably are avoided. However, if the methyl ester or ethyl ester of the dimeric acid is used so esterification involves the elimination of the methyl or ethyl alcohol, then and in that event, the reaction appears to be limited largely to involving the glycerol hydroxyl.

Another procedure which immediately suggests itself in the formation of the monomeric mixed glyceride is the procedure commonly referred to as re-esterification, cross-esterification, or transesterification. Such procedure is well known, and in essence, would involve, for example, mixing two moles of triricinolein with one mole of the total or complete glyceride of 9,11-linoleic acid. Such migration of the acyl radicals takes place at a temperature below the pyrolytic point of triricinolein and in presence of an alkaline catalyst. The suitable temperature is approximately 250° C., or slightly less, and the time required may be comparatively long, for instance, 36 to 72 hours.

In any event, one obtains the dimerized mixed glyceride by any suitable procedure, and the product employed should preferably contain at least 65% or more of the dimerized mixed glyceride, and some of the procedures above enumerated will yield a product markedly in excess of this value. Such mixed glyceride, if carefully prepared, has a viscosity approximately that of castor oil or slightly blown castor oil, a distinctly darker color, and perhaps a less pleasant odor. The chemical constants, such as molecular weight, iodine number, hydroxyl number and saponification value, approximate the calculated theoretical value. It is to be noted that this intermediate is not claimed herein per se.

It is well known that ricinoleic acid compounds, particularly castor oil, can be oxidized in various ways. This is usually accomplished by subjecting a ricinoleic compound to treatment such as blowing with a suitably gaseous oxidizing medium, e. g., air, oxygen, ozone, or ozonized air. Such oxidation is commonly carried out at ordinary or superatmospheric pressure (up to about 200 lbs. per square inch) either moist or dry; and in the presence or absence of a catalyst, such as lead oleate, cobalt linoleate, or manganese oleate, or such as alpha-pinene or linseed oil, etc. Care should be taken, however, not to permit temperature rise such that excessive pyrolytic decomposition would take place. The oxidation may be vigorous, as by vigorous blowing, or may be more gradual, as by exposure in thin films to air, provided the oxidation is sufficiently prolonged to obtain the desired drastic oxidation. Generally, the time required is at least about 8 to 10 hours, under conditions most favorable to oxidation, e. g., blowing at a relatively high temperature, and for certain fatty compounds much more prolonged oxidation, e. g., several days or even weeks, is desirable, especially under conditions less favorable to rapid oxidation. In any event, whether the oxidation is produced by continued mild oxidation, or by more vigorous oxidation, a condition of drastic oxidation is indicated by changes in chemical and physical properties of the material. These changes are usually indicated by a lowered iodine value, an increased saponification value, usually an increased acetyl value, an increased specific gravity, and an increased refractive index. Thus, the iodine number may become less than 70, and even as low as about 40. The saponification value may be about 215 to 283, and the acetyl value may be about 160 to about 200. The viscosity is increased and the drastically-oxidized product may become very heavy and stiff at ordinary temperatures. The refractive index is also increased. The color of the drastically-oxidized material may be a pale yellow or light amber, or may be a deep orange color. If oxidation is carried on long enough, a product of liver-like consistency and dark color is obtained, but since such material is more difficult to utilize, those drastically-oxidized ricinoleic compounds which are pale blown and have some fluidity at normal temperatures are preferred.

The same sort of procedure which is used to oxidize castor oil or similar ricinoleic acid derivatives may be used to oxidize dimerized 9,11-linolo-diricinolein. Generally speaking, however, the following modification should be kept in mind.

Such material may contain a small amount of 9,11-linoleic acid or its ester resulting from incomplete polymerization. Such product is recognized as a powerful catalyst for promoting oxidation of castor oil or similar materials. Thus, it is rarely necessary to add any catalyst to hasten oxidation. Furthermore, it is rarely necessary to oxidize under pressure, although such procedure may be employed. It is rarely necessary to use oxygen instead of air. Although any suitable temperature, from 110° C. or upwards, may be employed, it is my preference to oxidize at a temperature of approximately 120° C. to 130° C. and use a fairly long time interval, for instance, two to eight days, notwithstanding the fact that any of the usual procedures employed for oxidizing castor oil may be employed for oxidizing 9,11-linolo-diricinolein, and generally speaking, considerably less drastic conditions are required. The time element can be decreased somewhat, and in some instances, can be decreased significantly, particularly if in the early stage there is present any appreciable amount of the catalyst above noted, either added or naturally present. The same sort of apparatus and the same sort of procedure is employed as in the case of conventional oxidation of castor oil. The product subjected to oxidation in the instant procedure has a viscosity somewhat greater than castor oil and seems to body somewhat more readily. One precautionary step is necessary, and that is, in the final stages of oxidation, the procedure must be conducted more cautiously than with castor oil. In any event, the material, prior to oxidation, should be analyzed and oxidation should be conducted until there is a significant change, as indicated by increase in viscosity, change in indices, such as iodine number, hydroxyl number, etc., all of which is obvious to those skilled in the art. The product should not be oxidized to the place where it is no longer soluble in various solvents, hereinafter enumerated, such as xylene, anhydrous isopropyl alcohol, carbon tetrachloride, cresylic acid, etc.

The products herein contemplated are characterized by the fact that drastic oxidation has caused a reduction of at least 10% in the iodine value of the oxidized product when compared with the iodine value of the unoxidized reactant. Oxidation sufficient to reduce the original iodine value of the unoxidized product by 10% to 25% may be considered as light oxidation; more drastic oxidation sufficient to cause a reduction of 26% to 35% may be considered as medium oxidation; whereas, oxidation drastic enough to reduce the value by 36% to 50% may be considered as heavy oxidation. For example, assuming the iodine value of the unoxidized product is 90, the iodine value of a lightly blown grade would vary approximately from 67.5 to 81; a medium blown grade from 58.5 to 67.5; and a heavily blown grade from 45 to 58.5.

Variation in degrees of oxidation is obtained by extending the time of oxidation or using more severe conditions of oxidation, such as increased temperature, increased passage of air, addition of catalyst, etc. In any event, oxidation is stopped short of the stage where insoluble, spongy, or rubbery masses are obtained.

LIGHT-BODIED, LIGHT-BLOWN PRODUCT

Dimerized 9,11-linolo-diricinolein is oxidized by dry air at a temperature of 120° or somewhat in excess, for approximately four to five days, or slightly longer, so as to reduce the iodine value to 75% of its original value.

MEDIUM-BODIED, MODERATELY-OXIDIZED PRODUCT

The same procedure is followed as in Example 1, except the time of oxidation is extended by approximately two or three days, and the temperature raised slightly, if need be, so that at the end of the period, the product shows a reduction to 66⅔% of the original iodine value of the unoxidized product and an increased viscosity compared with the light blown product previously described.

HEAVY-BODIED, HEAVILY-BLOWN PRODUCT

The same procedure is followed as in the preceding example, except that oxidation is extended a few days longer and a somewhat higher temperature employed, if need be, so as to reduce the iodine value to approximately one-half of the original value of the unoxidized product.

The selection of suitable reactants in the manufacture of hydroxyacetylated or polyhydroxyacetylated blown 9,11-linolo-diricinolein dimer is, of course, simple. The blown product may be analyzed so as to determine its hydroxyl or acetyl value. Such value may be interpreted on the basis of each fatty acid radical present, i. e., the total hydroxyl value, divided by four, represents the value equivalent to that of each aliphatic acyl radical. For convenience, the blown product may be considered as a tetrahydric alcohol having a molecular weight of 1828, and thus, one may obtain a mono-hydroxyacetylated derivative, a dihydroxyacetylated derivative, a tri-hydroxyacetylated derivative, or even a tetra-hydroxyacetylated derivative.

For purpose of convenience, reference will be made to mono-hydroxyacetylated blown 9,11-linolo-diricinolein, di-hydroxyacetylated blown 9,11 - linolo - diricinolein, tri - hydroxyacetylated blown 9,11-linolo-diricinolein, and tetra-hydroxyacetylated blown 9,11-linolo-diricinolein.

Examination of the blown product, prior to hydroxyacetylation indicates values substantially as follows:

| | |
|---|---|
| Acid number | 10.5 to 36.3 |
| Saponification number | 200.0 to 300.0 |
| Iodine number | 40.5 to 65.0 |
| Acetyl number | 150.0 to 212.0 |
| Hydroxyl number | 170 to 240 |
| Percent unsaponifiable matter | Not over 3% |
| Percent ash | Trace |

Examination of the reaction between hydroxyacetic acid and castor oil or hydroxyacetic acid and blown castor oil, or as in the present instance, hydroxyacetic acid and blown 9,11-linolo-diricinolein, indicates that water is formed and removed. Actually, the water formed may not necessarily be removed instantly, and thus, the water present may enter into certain reactions. Likewise, for reasons of economy, it may be desirable to use a highly concentrated hydroxyacetic acid instead of the anhydrous material as the selected reactant. In such instances the water would readily enter into hydrolytic reaction, and thus, the product or composition which is actually hydroxyacetylated, may include a variety of cogeneric materials. In addition to the other products formed by hydrolysis, glycerol may be included. Although it is believed, in view of what has been said that no further description is necessary in regard to the manufacture of hydroxyacetylated compounds of the kind herein contemplated, the following examples are included by way of illustration:

HYDROXYACETYLATED BLOWN DIMER

*Example 1*

One thousand pounds of the dimer described under the heading "Light-bodied, light-blown product" is treated with 84 pounds of concentrated hydroxyacetic acid containing 30% of water. The reaction is conducted at 200–250° C. for approximately 2 hours. Completeness in reaction is indicated by the fact that elimination of water practically ceases, decrease in acid value and hydroxyl value of mixture, and elimination of free hydroxyacetic acid. The procedure is conducted in the usual reaction vessel of the kind employed for esterification, and may be constructed of any material which is resistant to the reactants. The amount of hydroxyacetic acid selected in the present instance is calculated so as to give substantially a mono-hydroxyacetylated blown dimer.

HYDROXYACETYLATED BLOWN DIMER

*Example 2*

The same procedure is employed as in Example 1, preceding, except that twice the amount of hydroxyacetic acid is used.

HYDROXYACETYLATED BLOWN DIMER

*Example 3*

The same procedure is followed as in Example 1, preceding, except that three times the amount of hydroxyacetic acid is employed.

HYDROXYACETYLATED BLOWN DIMER

*Example 4*

The same procedure is followed as in Example 1, preceding, except that four times the amount of hydroxyacetic acid is employed as a reactant.

HYDROXYACETYLATED BLOWN DIMER

*Example 5*

The same procedure is followed as in the four preceding examples, except that the reactant designated as "Light-bodied, light-blown product" is replaced by the blown dimer described under the heading "Medium-bodied, moderately-oxidized product."

HYDROXYACETYLATED BLOWN DIMER

*Example 6*

The same procedure is followed as in the five preceding examples, except that the reactant designated as "Light-bodied, light-blown-product," is replaced by the blown dimer described under the heading "Heavy-bodied, heavily-blown product".

HYDROXYACETYLATED BLOWN DIMER

*Example 7*

The same procedure is followed as in Examples 1 to 6, preceding, except that anhydrous hydroxyacetic acid is employed and water is removed immediately upon formation. The product so obtained represents hydroxyacetylated blown dimer, or more especially, hydroxyacetylated blown triricinolein, in the presence of a minimum amount of hydroxyacetylated cogeners.

If the amount of hydroxyacetic acid employed is greater than that which can react with the available hydroxyl radical, then the hydroxyacetic acid polymerizes in the same way that diricinolein, triricinolein, etc., is obtained from monomeric ricinoleic acid. Such acids are obviously ester acids obtained by self-esterification.

The constitution of such polyhydroxyacetic acids and their relationship to hydroxyacetic acid, is readily shown by the following formulas:

$OHCH_2COOH$ $OHCH_2COOCH_2COOH$ $OHCH_2COOCH_2COOCH_2COOH$ $OHCH_2COOCH_2COOCH_2COOCH_2COOH$ $OHCH_2COOCH_2COOCH_2COOCH_2COOCH_2$ $OHCH_2COOCH_2COOCH_2COOCH_2COOCH_2COOH$ $OH(CH_2COO)_nH$ $n$ being at least 2 and not over 10.

In the present instance, however, the polyhydroxyacetic acids, in view of the previous limitation, based on amounts of reactants employed, are limited to the dimeric specie or trimer specie of the structure $$OH(CH_2COO)_2H$$

$$OH(CH_2COO)_3H$$

It is obvious that such products are obtained by the same procedure indicated previously in "Hydroxyacetylated blown dimer, Examples 4, 5 and 6," and that part of Example 7 which employs the same stoichiometric ratio of reactants. The only difference in manufacturing procedure is employment of double, triple or quadruple the amount of hydroxyacetic acid.

In light of what has been said earlier in this description, it is obvious that the oxidation reaction may be employed after hydroxyacetylation. This is comparable to the process of manufacture employed in the aforementioned U. S. Patent No. 2,340,305. By way of illustration, the following examples are included:

HYDROXYACETYLATED DIMER

*Example 1*

1,000 pounds of the dimer of the following composition:

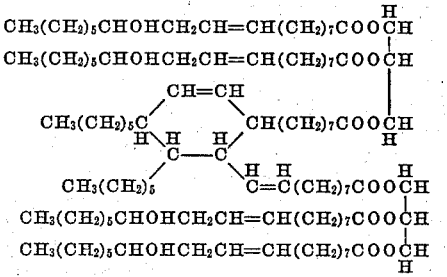

having a hydroxyl value of approximately 110, is treated with 200/220 pounds of concentrated hydroxyacetic acid containing 30% of water. The temperature employed is about 180°–205° C. for 6 to 16 hours, with elimination of water, and in any event, until analytical tests show an appropriate reduction in hydroxyl value. The reaction mass is stirred constantly during reaction.

HYDROXYACETYLATED DIMER

*Example 2*

The same procedure is employed as in Example 1, preceding, except that twice the amount of hydroxyacetic acid is employed so as to obtain a di-hydroxyacetylated dimer.

HYDROXYACETYLATED DIMER

*Example 3*

The same procedure is followed as in Example 1, preceding, except that three times the amount of hydroxyacetic acid is employed so as to yield a substantially trihydroxyacetylated dimer.

HYDROXYACETYLATED DIMER

Example 4

The same procedure is followed as in Example 1, preceding, except that four times the amount of hydroxyacetic acid is employed so as to obtain a tetra-hydroxyacetylated dimer.

HYDROXYACETYLATED DIMER

Example 5

The same procedure is followed as in Example 1, preceding, except that anhydrous hydroxyacetic acid is employed and water is removed immediately upon formation. The product so obtained represents hydroxyacetylated dimer, or more specifically, hydroxyacetylated 9,11-linolodiricinolein, in the presence of a minimum amount of hydroxyacetylated cogeners.

HYDROXYACETYLATED DIMER

Example 6

In light of what has been said previously, as to the utilization of polyhydroxyacetic acid and its derivatives, the same procedure is followed as in Example 4, preceding, and that part of Example 5 which is an analogous composition, except that two times or three times as much hydroxyacetic acid is employed so as to introduce a di-hydroxyacetic acid radical or a tri-hydroxyacetic acid radical.

In the production of compounds of the kind herein described for various uses, and particularly for use as a demulsifier, it is to be noted that hydroxyacetylation and oxidation may take place simultaneously and need not take place in successive steps, as exemplified by similar procedures in connection with castor oil or its equivalent. Such procedures have been described in aforementioned patents—U. S. Patent Nos. 2,340,-305, 2,340,306 and 2,340,308.

As an example of such procedure, one need only mix the dimer with a predetermined amount of anhydrous hydroxyacetic acid or the 70% aqueous solution. The ratio of reactants employed correspond to those in the various prior examples. The mixture is agitated and heated to any convenient temperature, for instance, 165° to 205° C., with constant oxidation and stirring, so as to eliminate moisture and permit oxidation to take place more rapidly. Oxidation can usually be accomplished within ten to forty hours, and the resultant product, although perhaps different in degree, is not different in kind from the type of material obtained by either oxidation followed by hydroxyacetylation, or the reverse procedure.

Attention is directed to the fact that hydroxyacetic acid can undergo various pyrolytic or pyrogenic reactions forming a variety of materials other than the polyhydroxyacetic acids above noted. It has been my experience that when the temperature is held at 200° C., or slightly under, provided the reaction is not conducted to excessive lengths, as indicated by analytical determinations, there is comparatively little of such cogeneric compounds obtained and the bulk of the compounds represent hydroxyacetylated derivatives or polyhydroxyacetylated derivatives. If a temperature perceptibly higher than this temperature is employed, for instance 210°, or higher, and particularly for any great length of time, and if the reaction is not stopped at completion, then and in that event, one may obtain a significant portion of other compounds, which, although not objectionable, may not be equally suitable for the same purpose as herein contemplated.

OXIDIZED HYDROXYACETYLATED DIMER

Example 1

A hydroxyacetylated dimer of the kind described under the heading "Hydroxyacetylated dimer, Example 1," or "Hydroxyacetylated dimer, Example 2," or "Hydroxyacetylated dimer, Example 3," is oxidized by dry air at a temperature of 120° C. or somewhat in excess for approximately four or five days, or slightly longer, so as to reduce the iodine value to 75% of its original value.

OXIDIZED HYDROXYACETYLATED DIMER

Example 2

The same procedure is follawed as in Example 1, except the time of oxidation is extended by approximately two or three days and the temperature raised slightly, if need be, so that at the end of the period, the product shows a reduction to 66⅔% of the original iodine value of the unoxidized product and an increased viscosity compared with the light-blown product previously described.

OXIDIZED HYDROXYACETYLATED DIMER

Example 3

The same procedure is followed as in the preceding example, except that oxidation is extended for a few days longer and a somewhat higher temperature employed, if need be, so as to reduce the iodine value to approximately one-half the original value of the unoxidized product.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials employed as the demulsifying agent of my process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent employed in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of my demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

One preferred and more narrow aspect of my invention, insofar as it is concerned with demulsification of petroleum emulsions of the water-in-oil type, is concerned with the admixture of the compounds or composition described, with a viscosity-reducing solvent, such as the various solvents enumerated, particularly aromatic solvents, alcohols, ether alcohols, etc., as previously specified. The word "solvent" is used in this sense to refer to the mixture, if more than one solvent is employed, and generally speaking, it is my preference to employ the demulsifier in a form representing 40% to 85% demulsifier and 15% to 60% solvent, largely, if not entirely, non-aqueous and so selected to give a solution or mixture particularly adaptable for proportional pumps or other measuring devices. The following examples will illustrate this aspect of my invention.

DEMULSIFIER

Example 1

|  | Percent |
|---|---|
| Hydroxyacetylated blown dimer, Example 4 | 60 |
| Xylene | 20 |
| Isopropyl alcohol | 20 |

DEMULSIFIER

Example 2

|  | Percent |
|---|---|
| Hydroxyacetylated blown dimer, Example 5 | 70 |
| Cresylic acid | 20 |
| Amyl alcohol | 10 |

DEMULSIFIER

Example 3

|  | Percent |
|---|---|
| Hydroxyacetylated blown dimer, Example 6 | 45 |
| Aromatic petroleum solvent | 20 |
| Isobutyl alcohol | 20 |
| Acetone | 15 |

(The above proportions represent percentage by weight.)

In the hereto appended claims the product contemplated is described in terms of method of manufacture. The reason is obviously the same reason that makes it impossible to describe blown castor oil by structural formula or combination of structural formulae. In the first place, a variety of products are formed during oxidation, and in many instances, such products either have not been identified at all, or have partially been identified. To a marked degree, the chemistry of oxidation of castor oil or my product, as herein described, is still obscure. It is also to be noted that such mode of description has been used repeatedly in the patent literature.

Attention is directed to my co-pending application, Serial No. 604,991, filed July 13, 1945.

Previous reference has been made to the fact that the preferred form of the present composition, when used for demulsification, involves admixture with viscosity-reducing solvents, as exemplified by "Demulsifier, Examples 1 to 3," preceding. It may be well to emphasize the fact that in such examples the hydroxyacetylated and oxidized product is both oil and water-insoluble, and this characterizes one property of the most desirable mixtures with solvents, i. e., that the hydroxyacetylated and blown esters employed for admixture with the solvent be both oil and water-insoluble within the ordinary meaning.

The new chemical products or compounds herein described form the subject-matter of my divisional application Serial No. 670,534, filed May 17, 1946.

Having thus described my invention, what I claim as new and desire to secure by Letters Patent is:

1. A process for breaking petroleum emulsions of the water-in-oil type, characterized by subjecting the emulsion to the action of a hydroxyacetylated and drastically-oxidized dimer of the formula:

$$\begin{array}{l}
CH_3(CH_2)_5CHOHCH_2CH=CH(CH_2)_7COOCH\\
CH_3(CH_2)_5CHOHCH_2CH=CH(CH_2)_7COOCH\\
\quad\quad CH=CH\\
CH_3(CH_2)_5C\diagup\quad\diagdown CH(CH_2)_7COOCH\\
\quad\quad H\diagdown H\quad H\diagup\quad\quad\quad H\\
\quad\quad\quad C-C\\
\quad\diagup\quad\quad\diagdown H\ H\quad\quad\quad H\\
CH_3(CH_2)_5\quad\quad C=C(CH_2)_7COOCH\\
CH_3(CH_2)_5CHOHCH_2CH=CH(CH_2)_7COOCH\\
CH_3(CH_2)_5CHOHCH_2CH=CH(CH_2)_7COOCH\\
\quad\quad\quad\quad\quad\quad\quad\quad\quad\quad\quad\quad H
\end{array}$$

said drastic oxidation being conducted by means of an oxygen-containing gas.

2. A process for breaking petroleum emulsions of the water-in-oil type, characterized by subjecting the emulsion to the action of a hydroxyacetylated and drastically-oxidized dimer of the formula:

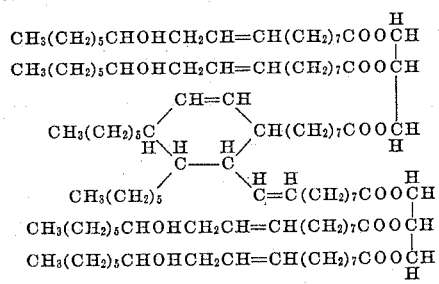

said drastic oxidation taking place by means of air.

3. The process of claim 1, wherein the drastic oxidation measured by reduction in iodine value of the final oxidized product, in comparison with the original unoxidized reactant is a reduction of at least 10% and not over 50%.

4. The process of claim 1, wherein the drastic oxidation measured by reduction in iodine value of the final oxidized product, in comparison with the original unoxidized reactant is a reduction of at least 15% and not over 25%.

5. The process of claim 1, wherein the drastic oxidation measured by reduction in iodine value of the final oxidized product, in comparison with the original unoxidized reactant is a reduction of at least 26% and not over 35%.

6. The process of claim 1, wherein the drastic oxidation measured by reduction in iodine value of the final oxidized product, in comparison with the original unoxidized reactant is a reduction of at least 36% and less than 50%.

MELVIN DE GROOTE.

REFERENCES CITED

The following references are of record in the file of this patent:

UNITED STATES PATENTS

| Number | Name | Date |
|---|---|---|
| 2,310,395 | Carruthers | Feb. 9, 1943 |
| 2,363,506 | De Groote et al. | Nov. 28, 1944 |
| 2,340,307 | De Groote et al. | Feb. 1, 1944 |
| 2,340,308 | De Groote et al. | Feb. 1, 1944 |